2,945,069
Patented July 12, 1960

2,945,069
SYNTHESIS OF β-CAROTENE

Max H. Stern, Rochester, N.Y., assignor to Eastman Kodak Company, Rochester, N.Y., a corporation of New Jersey No Drawing. Filed Jan. 31, 1958, Ser. No. 712,317

7 Claims. (Cl. 260—606.5)

This invention relates to the preparation of β-carotene.

The compound, β-carotene, is a vitamin A-active compound having the following structural formula:

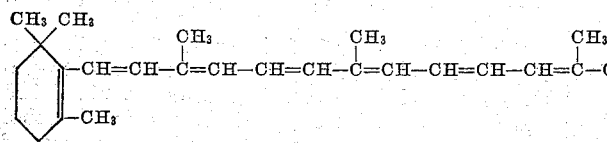

Compound I

Such a compound not only has vitamin A activity, but also, is highly colored because of its long-chain conjugated unsaturation. In view of the vitamin A activity and coloration of β-carotene, it is a highly useful compound for fortifying and coloring food products, particularly such fatty materials as margarine.

Carrots, palm oil, alfalfa and other materials have been employed as natural sources of β-carotene. However, β-carotene has also been prepared synthetically, and there are several synthetic methods for preparing β-carotene described in the literature.

It is an object of this invention to provide a new method for synthesizing β-carotene.

It is another object of this invention to prepare β-carotene by a novel chemical synthesis which utilizes vitamin A aldehyde.

It is also an object to provide a novel phosphonium salt particularly useful in the preparation of β-carotene.

These and other objects of the invention are attained by means of this invention as described more fully hereinafter with reference to certain preferred embodiments thereof as described hereinafter.

The process of the invention comprises reacting retrovitamin A halide with a triaryl phosphine to form a retrovitamin A triaryl phosphonium halide, converting the resulting retrovitamin A triaryl phosphonium halide to a triaryl phosphorous-ylid having the vitamin A carbon structure with a strong organic base, and reacting the resulting triaryl phosphorous-ylid with vitamin A aldehyde to form β-carotene.

Retrovitamin A halide used in the present process has the following structural formula:

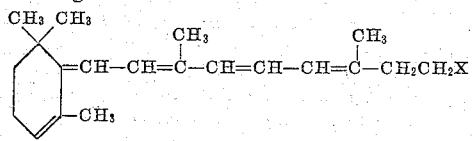

Compound II wherein X is a halogen such as chlorine, bromine or iodine. Retrovitamin A bromide is the preferred reactant. Retrovitamin A halide can be prepared by halogenating retrovitamin A alcohol, Compound IV, which can be readily prepared by saponification of retrovitamin A acetate (Compound III). The preparation of retrovitamin A acetate from vitamin A acetate was described by Beutel et al., J. Am. Chem. Soc. 77, 5166 (1956). The preparation of retrovitamin A bromide, for example, by such a process can be represented by the following series of equations:

Vitamin A acetate $\xrightarrow{\text{HBr}}$

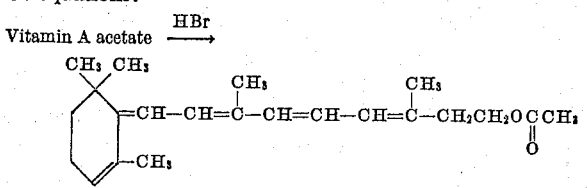

Compound III

Compound III $\xrightarrow{\text{KOH}}$

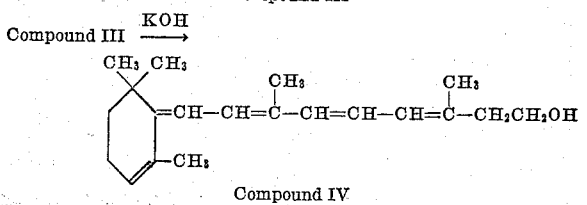

Compound IV

Compound IV $\xrightarrow{\text{PBr}_3}$

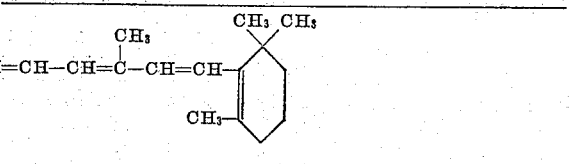

Compound V

In accordance with the process of the invention, retrovitamin A halide is reacted with a triaryl phosphine to form a retrovitamin A triaryl phosphonium halide salt. The preferred triaryl phosphine is triphenyl phosphine, although other triaryl phosphines containing substituents, such as alkyl groups in the aromatic ring, can also be utilized. The formation of a typical phosphonium salt, retrovitamin A triphenyl phosphonium bromide is illustrated by the following equation:

Compound V $\xrightarrow{(C_6H_5)_3P}$

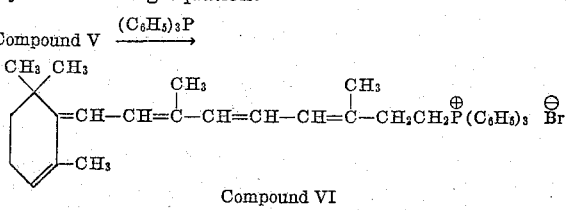

Compound VI

The retrovitamin A halide is reacted with the triaryl phosphine under substantially anhydrous conditions in a solvent substantially inert to the reaction. Such aromatic solvents as benzene, toluene and the like, as well as ethanol, dimethyl formamide, diethyl ether, tetrahydrofuran, and others can be suitably employed. The reaction can be conveniently effected at room temperature, with temperatures of about 15–35° C. being more generally used. As the triaryl phosphine is less expensive than the retrovitamin A halide, a stoichiometric excess of the triaryl phosphine is preferably employed, one mole of each of these reactants reacting to form the retrovitamin A triaryl phosphonium halide. The reaction is carried out until the retrovitamin A halide is converted to a triaryl phosphonium halide, the reaction time varying with such reaction variables as the nature of the solvent, the reactants and the reaction temperature, and with typical reaction period ranging from about 12 hours to 3 or even 5 days.

In the present process, the retrovitamin A triaryl phosphonium halide is treated with a strong organic base, and the resulting reaction product reacted with vitamin A aldehyde to form β-carotene, Compound I. Typical bases that can be suitably employed in this reaction include lithium butyl, lithium phenyl, sodium triphenyl, sodium acetylide, sodium ethylate, alcoholic potassium hydroxide, and the like. The following equations illustrate the conversion of a retrovitamin A triaryl phosphonium halide to β-carotene.

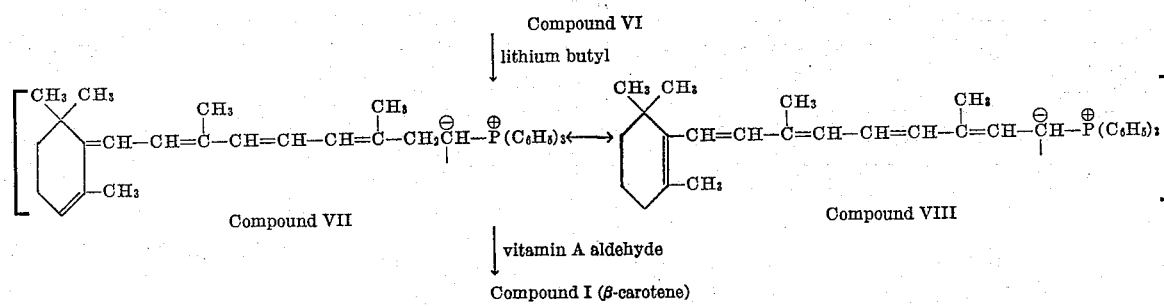

The retrovitamin A triaryl phosphonium halide is treated with an organic base and thereafter reacted with vitamin A aldehyde under substantially anhydrous conditions in a solvent substantially inert to the reaction. The same solvent media used in preparing the retrovitamin A triaryl phosphonium halide can also be utilized as the media for converting the retrovitamin A triaryl phosphonium halide to β-carotene in the present process. If desired, the retrovitamin A triaryl phosphonium halide can be separated and worked-up or purified, and the resulting product dissolved in another one of the solvents described above. The retrovitamin A triaryl phosphonium halide can be conveniently treated with the organic base and thereafter reacted with vitamin A aldehyde to form β-carotene at room temeprature, with temperatures of about 15–60° C. being more generally used. At least one molar proportion of the organic base is used to treat each mole of the retrovitamin A triaryl phosphonium halide, with a molar excess of 1% to 5%, or even 10% of the organic base being suitably used. The retrovitamin A triaryl phosphonium halide is reacted with the organic base until the retrovitamin A triaryl phosphonium halide is converted into a triaryl phosphorous-ylid, the reaction time varying with such reaction variables as the nature of the solvent, the reactants, and the reaction temperature, with typical reaction periods ranging from about 30 minutes to 2 hours or 3 hours. The resulting triaryl phosphorous-ylid is thereafter reacted with at least a molar excess of vitamin A aldehyde to form β-carotene, typical reaction periods ranging from 1 hour to 4 or 5 hours.

The triaryl phosphorous-ylid compounds prepared in accordance with the process of the invention, and illustrated by Compound VII and Compound VIII have the vitamin A carbon structure or skeleton,

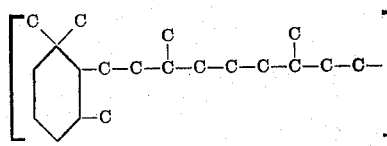

and are not isolated or separated in the present process, but rather vitamin A aldehyde is reacted directly with the reaction product of the organic base and the retrovitamin A triaryl phosphonium halide. In the course of treating the retrovitamin A triaryl phosphonium halide with an organic base and reacting the resulting reaction product with vitamin A aldehyde, the retrovitamin A moiety in the reaction mixture is isomerized to the vitamin A double bond configuration, and thus, the final product is β-carotene and not a retro isomer of β-carotene. Such an isomerization was quite unexpected but particularly useful in the present synthesis. Retrovitamin A halides can be readily prepared as described above by a relatively simple direct halogenation of retrovitamin A alcohol with such reactants as phosphorous tribromide or phosphorous trichloride, for example. However, attempts to so directly halogenate vitamin A alcohol result in the destruction of substantial amounts of the vitamin A alcohol. Hence, particularly important features of the present process include the use of a retrovitamin A halide and a subsequent isomerization to convert this retro configuration into the configuration comprising the final product, β-carotene.

There are several methods known in the art for preparing the vitamin A aldehyde used in the present process, one method being disclosed in Robeson et al., United States Patent No. 2,507,647, wherein vitamin A alcohol was reacted with an excess of a ketone in the presence of an aluminum or magnesium alkoxide and an amine, such as aniline, to form an amine derivative which, upon acid hydrolysis, gave vitamin A aldehyde. Likewise, vitamin A aldehyde prepared by any other process can be employed in the present process.

The invention is further illustrated by the following examples of preferred embodiments thereof.

Example 1

A 17 g. sample of retrovitamin A alcohol (Compound IV) prepared from vitamin A acetate by saponification of retrovitamin A acetate (Compound III) synthesized by the procedure of Beutel et al., J. Am. Chem. Soc. 77, 5166 (1956) was dissolved in 180 cc. of Skellysolve F (a petroleum ether boiling 30–60° C.). To the resulting solution was added dropwise 7.05 g. of phosphorous tribromide over a 45-minute period, the reaction mixture being maintained at a temperature of −7 to −5° C. Thereafter the reaction mixture was stirred for an additional 30 minutes at 0° C., poured onto ice, stirred for another 5 minutes and the Skellysolve layer separated. The separated Skellysolve layer was then dried over anhydrous sodium sulfate and the Skellysolve solvent removed under vacuum to give 11.1 g. of retrovitamin A bromide (Compound V) having $E_{1\,cm.}^{1\%}$ (348 mμ) (368 mμ) = 1210, 1240

Example 2

A 12.5 g. sample of retrovitamin A bromide (Compound V) was dissolved in 15 cc. of anhydrous benzene containing 10.2 g. of triphenyl phosphine. The resulting mixture was allowed to stand for 4 days at room temperature (20–25° C.) and then poured into 210 cc. of Skellysolve F (a petroleum ether boiling 30–60° C.). A yellow solid phosphonium salt, retrovitamin A triphenyl phosphonium bromide (Compound VI), crystallized out of the reaction mixture and was separated by filtration. The separated phosphonium salt weighed 6.19 g., melted 88–106° C. and showed $E_{1\,cm.}^{1\%}$ (360 mμ) (345 mμ) = 533, 513 and contained 11.7% bromine and 5.02% phosphorous. A 5.5 g. sample of the resulting phosphonium salt was suspended in 90 cc. of anhydrous diethyl ether and thereafter 9.6 cc. of 0.72 N. lithium butyl in anhydrous diethyl ether were added. The resulting mixture was stirred at room temperature (20–25° C.) for 1.5 hours during which time the color of the mixture changed from deep red to brown. To the resulting phosphorous-ylid mixture was added 1.96 g. of vitamin A aldehyde (retinene) dissolved in 60 cc. of anhydrous diethyl ether and then stirred for 3 hours at room temperature (20–25° C.). The resulting mixture was then filtered and washed with saturated ammonium chloride and with water to neutrality. After drying the washed sample over anhydrous sodium sulfate, the diethyl ether was removed under vacuum to give 2.69 g. of a β-carotene concentrate having $$E_{1cm.}^{1\%} \ (450 \ m\mu) = 229$$

The resulting β-carotene concentrate was purified by chromatographing on a sodium aluminum silicate adsorbent to give 0.32 g. of β-carotene having $$E_{1cm.}^{1\%} \ (450 \ m\mu) = 710$$

The ultraviolet analysis indicated that the product contained none of the retro chromophore.

Although the invention has been described in considerable detail with reference to certain preferred embodiments thereof, it will be understood that variations and modifications can be effected within the spirit and scope of the invention as described hereinabove and as defined by the appended claims.

I claim:
1. The process which comprises reacting a retrovitamin A halide with a triaryl phosphine to form a retrovitamin A triaryl phosphonium halide, converting the resulting phosphonium halide to a triaryl phosphorous-ylid having the vitamine A carbon structure with a strong organic base, and reacting the said phosphorous-ylid with vitamin A aldehyde to form β-carotene.

2. The process according to claim 1 wherein the retrovitamin A halide is retrovitamin A bromide.

3. The process according to claim 1 wherein the triaryl phosphine is triphenyl phosphine.

4. The process according to claim 1 wherein the strong organic base is lithium butyl.

5. The process which comprises reacting retrovitamin A bromide with a triaryl phosphine under substantially anhydrous conditions at a temperature of 15–35° C. to form a retrovitamin A triaryl phosphonium bromide, converting the resulting phosphonium bromide to a triaryl phosphorous-ylid having the carbon structure of vitamin A with a strong organic base under substantially anhydrous conditions at a temperature of 15–60° C., and thereafter reacting the resulting reaction product with vitamin A aldehyde under substantially anhydrous conditions at a temperature of 15–60° C. to form β-carotene.

6. The process which comprises reacting retrovitamin A bromide with triphenyl phosphine under substantially anhydrous conditions at a temperature of 15–35° C. to to form retrovitamin A triphenyl phosphonium bromide, treating the resulting phosphonium bromide with lithium butyl under substantially anhydrous conditions at a temperature of 15–60° C. and thereby forming a triphenyl-phosphorous-ylid having the vitamin A carbon structure, and thereafter reacting the resulting triphenyl phosphorous-ylid reaction product with vitamin A aldehyde under substantially anhydrous conditions at a temperature of 15–60° C. to form β-carotene.

7. Retrovitamin A triphenyl phosphonium bromide.

References Cited in the file of this patent

UNITED STATES PATENTS

| | | |
|---|---|---|
| 2,652,433 | Blaizot | Sept. 15, 1953 |
| 2,741,644 | Blaizot | Apr. 10, 1956 |
| 2,743,299 | Flynn et al. | Apr. 24, 1956 |
| 2,745,877 | Vindler et al. | May 15, 1956 |
| 2,842,599 | Isler et al. | July 8, 1958 |